Jan. 20, 1970   R. N. QUENNEVILLE   3,490,537
QUICK DISCONNECT RETENTION
Filed April 17, 1967   2 Sheets-Sheet 1
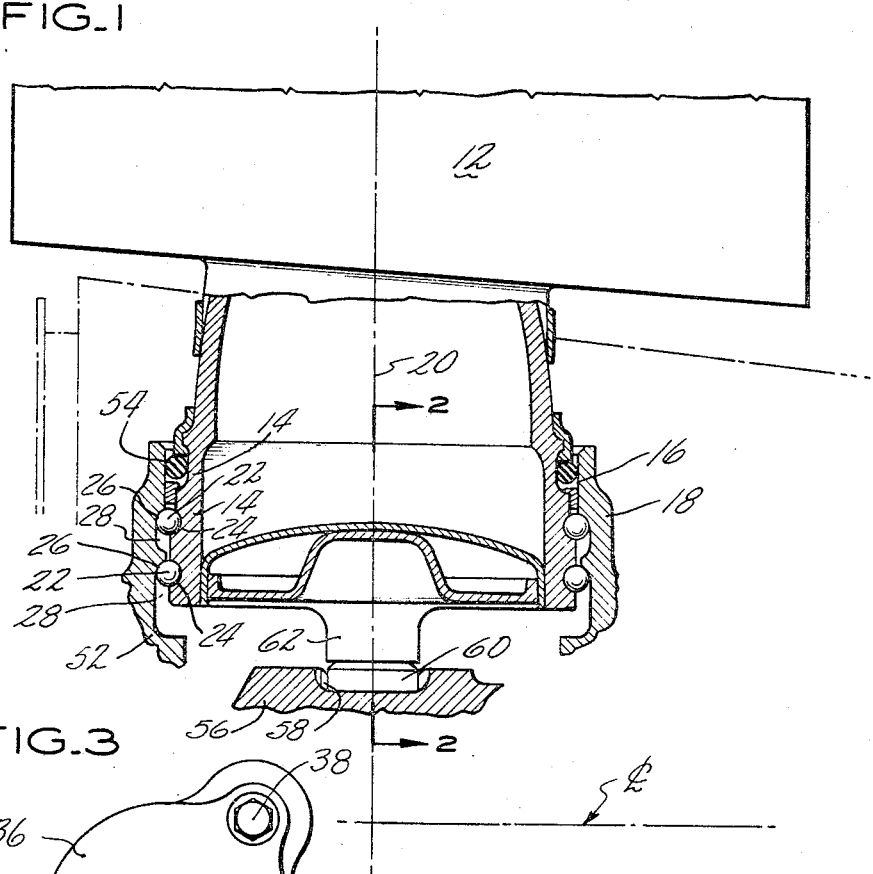
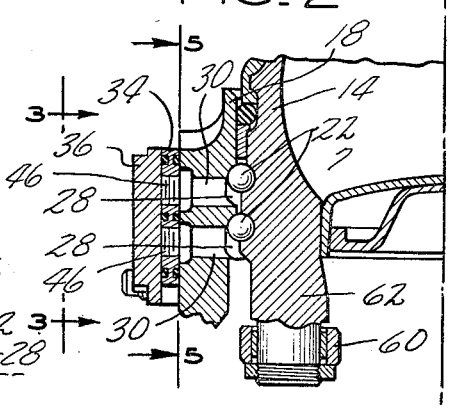
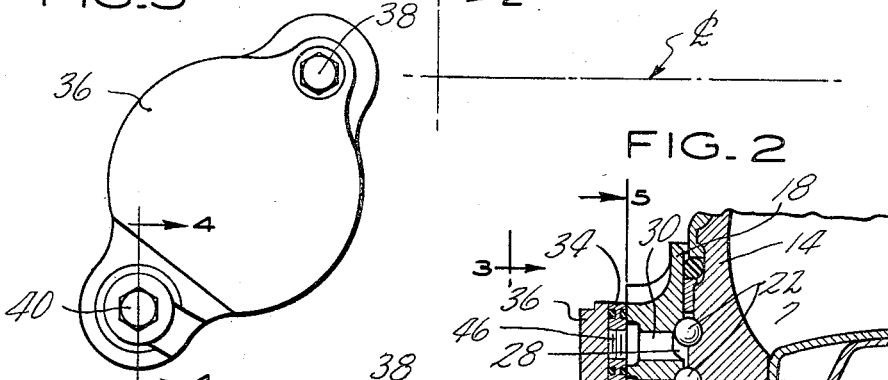
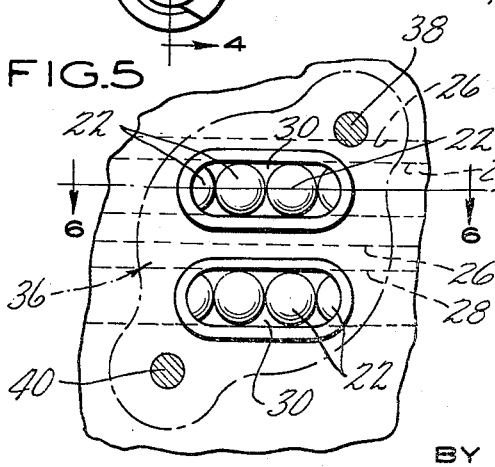
INVENTOR
RAYMOND N. QUENNEVILLE
BY Harris G. Lucher
ATTORNEY

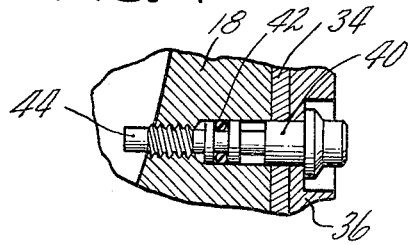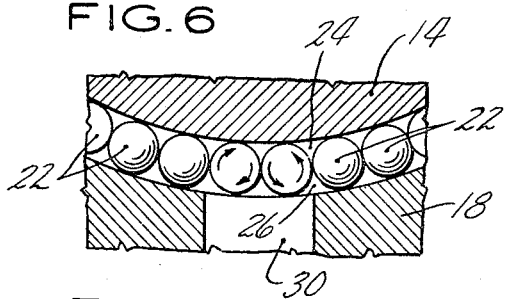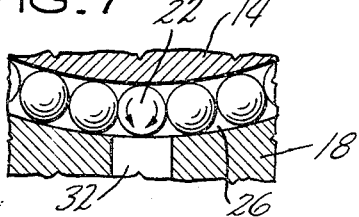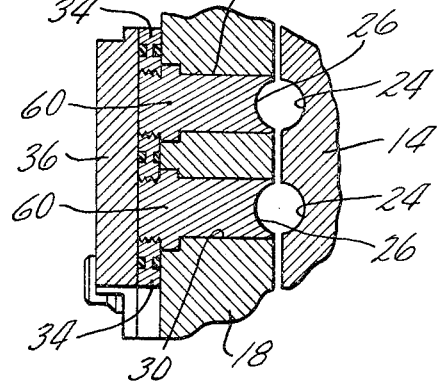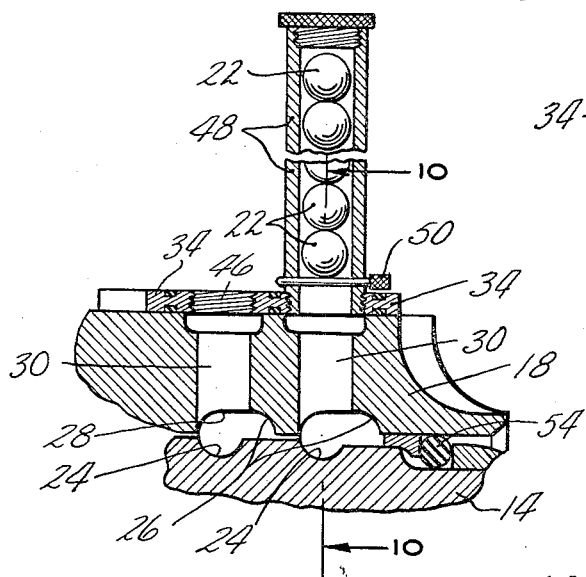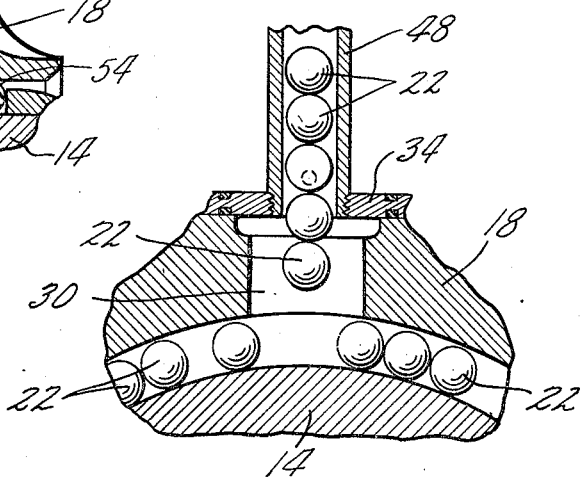

United States Patent Office 3,490,537
Patented Jan. 20, 1970

3,490,537
QUICK DISCONNECT RETENTION
Raymond N. Quenneville, Suffield, Conn., assignor to United Aircraft Corporation, East Hartford, Conn., a corporation of Delaware
Filed Apr. 17, 1967, Ser. No. 631,481
Int. Cl. B64c 11/06
U.S. Cl. 416—174                    7 Claims

ABSTRACT OF THE DISCLOSURE

A propeller blade ball bearing retention having an elongated loading and unloading passageway in one race long enough to accommodate at least two balls to permit free-falling of the balls in removing the balls from the bearing. A removabe plate covers the passageway and is threaded to receive a loading tube holding the exact number of balls required by the bearing. A plug fills the passageway and prevents reentry of the balls into the passageway where it intersects the ball runway, or the passageway may be offset from the runway.

BACKGROUND OF THE INVENTION

This invention relates to ball bearings and particularly to loading and unloading means for assembling the balls with the ball races to assemble the bearing and removing the balls from the races to disassemble the bearings.

In assembling and disassembling propeller blades with their supporting hubs, particularly in the field, where the blades are supported in the hub by ball bearings in which the balls are inserted into or removed from the ball races through a substantially round hole slightly larger than the ball, the balls are reluctant to drop through the hole. Provision is made to move the mating races axially to provide clearance but the friction of the balls prevents free movement out of the hole. Considerable shaking of the assembly is required to intermittently relieve the friction requiring considerable time. The present invention relieves the friction and provides for almost instantaneous insertion and removing of the balls.

It sometimes happens that one or more blades of a propeller may be damaged and the aircraft may successfully land but be unable to again take off with the damaged propeller. It is then very convenient to be able to quickly remove the damaged propeller blade and replace it with a new or undamaged blade so that the aircraft may then successfully take off and resume flight. If the propeller is one of several interconnected propellers so that its services may be dispensed with but the damage is such that the flight cannot be continued with the damaged blade and no replacement is available, it is very convenient to be able to quickly remove all of the blades of that propeller and then again take off and continue the flight with the remaining undamaged portion of the propulsion system.

It has previously been possible with various types of retention to remove a propeller blade but this has entailed a long and tedious process and sometimes requires special tools to disassemble the blade and propeller which tools are generally not available in the field, particularly where the landing is a forced landing.

Applicant's invention provides a means for quickly releasing a propeller blade from its retention and requires only a simple wrench to perform the operation. If the damaged blade is to be replaced by a spare blade, the only tool required would be the so-called loading tool carrying a supply of replacement balls for the ball retention of the blade. Such loading tool would normally be supplied with and attached to the spare blade. This invention is shown applied to an aeronautical propeller blade retention bearing, but it should be understood that it can be applied to other mechanism and other bearings.

SUMMARY OF INVENTION

An object of the invention is means for quickly disassembling a bearing.

A further object is a propeller assembly in which the blades may be quickly removed or replaced.

A still further object is a controllable pitch propeller blade mounting in which the blade retention including the anti-friction blade support may be quickly disassembled and a damaged blade removed and replaced by an undamaged one or all of the blades of a multi-blade propeller quickly removed to permit resumption of flight on the remaining propellers of an aircraft.

Other objects and advantages will be apparent from the following specification and the accompanying drawings.

BRIEF DESCRIPTION OF THE DRAWING

FIGURE 1 is a vertical cross section of a portion of a propeller blade and hub incorporating the present invention;

FIGURE 2 is a section along line 2—2 of FIGURE 1;

FIGURE 3 is a view along line 3—3 of FIGURE 2;

FIGURE 4 is a cross sectional view along line 4—4 of FIGURE 3;

FIGURE 5 is a view along line 5—5 of FIGURE 2;

FIGURE 6 is a sectional view along line 6—6 of FIGURE 5;

FIGURE 7 is a view similar to FIGURE 6 but showing the prior art for explanatory purposes;

FIGURE 8 is a partial sectional view similar to FIGURE 2 but showing a modification;

FIGURE 9 is a view similar to FIGURE 2 but with the cover plate removed, the propeller rotated to bring the loading holes above the blade and showing the loading tube in position;

FIGURE 10 is a view along line 10—10 of FIGURE 9 with the ball retaining pin removed.

DESCRIPTION OF THE PREFERRED EMBODIMENT

As shown in FIGURE 1 a propeller blade 12 having a blade shank 14 is mounted in a blade socket 16 in a propeller hub 18. The blade is mounted for pitch changing movement about a pitch changing axis 20 and is retained in the hub 18 for such pitch changing movement by means of bals 22 cooperating with ball races or grooves 24 in the blade shank 14 and cooperating races or grooves 26 in the hub 18. These balls 22 and the ball races 24 and 26 act as a thrust bearing to facilitate pitch changing movement of the blade and absorb the centrifugal thrust of the blade. The race 24 in the blade shank closely fits the ball 22 allowing only the normal clearance allowed in that type of thrust bearing. The brace 26 is enlarged on its non-thrust side to provide a somewhat greater clearance to permit free rolling of the balls in loading and unloading the balls into and out of the bearing races. As shown in FIGURE 1 the bearing groove is enlarged at 26 so that the blade may be pushed further into the hub socket and cause the ball 22 to be moved from the thrust portion of the race 26 into the clearance portion 28 which may be slightly larger in diameter or depth.

As shown in FIGURE 2 loading holes or passageways 30 may be provided in alignment with intersecting or opening into the clearance portion 28 of the bearing grooves in the hub. As shown in FIGURE 5 this loading hole 30 is slightly wider than one ball diameter transversely of the bearing race and groove 26, 28 and is slightly longer than twice the diameter of the balls 22 longitudinally of or circumferentially along the bearing race 26, 28. This loading and unloading slot should be sufficiently larger than the ball diameter transversely of the bearing grooves to provide clearance between the balls and the side of the loading hole to avoid friction and preferably should be sufficiently larger than two ball diameters along the bearing grooves to provide clearance at the ends of the slots and avoid friction of the balls in passing in either direction through the slot to or from the bearing races.

As shown in FIGURE 7 where the loading hole 32 is only one ball diameter wide lengthwise of the race the friction of the remainder of the balls in the race pressing on the ball 22 located above the loading hole will hold the ball in position and prevent it from dropping under the influence of gravity through the loading hole until the pressure from one of the balls on either side of the ball above the loading hole is relieved. This must be done for each ball as it arrives above the loading hole. Thus loading or unloading the balls in the bearing is a long and tedious operation where the loading hole 32 is only slightly larger than the ball diameter in all directions and must be accompanied with considerable shaking of the bearing in both loading and unloading in order to jar the balls loose.

As shown in FIGURE 6 however, when the loading hole 30 is made at least two balls wide then the two balls above the loading hole are free to roll substantially without friction on each other and on the adjacent balls on either side of the said two balls and can thus freely drop under the influence of gravity. In practice it has been found that when the propeller is turned so that the loading hole is directed downwardly and the propeller blade is pushed inwardly so that the groove 24 in the blade shank 14 forces the balls 22 into the clearance groove 28 in the hub all the balls of the bearing drop out through the loading hole 30 in a continuous stream and all the balls are removed from the bearing almost instantly. The blade then being free of the balls can be pulled out of the hub socket and discarded or replaced with a spare blade.

As shown in FIGURE 2 the loading holes are covered by a seal plate 34 having packing material associated therewith and held in position by a cover plate 36. The cover plate 36 is secured to the hub 18 by means of cap screws 38 and 40. The cap screw 40 has a packing member 42 thereon and extends completely through the hub into the blade socket cavity. An extension plug 44 on the end of the cap screw 40 will be positioned under the inner end of the propeller blade or under members contacting therewith to hold the blade in its outward position and prevent inward movement of the blade in conditions such as when the propeller is stopped and the blade is in an upwardly extending vertical position. This cap screw will be backed out clear of the blade when it is desired to push the blade in to release the balls.

To unload the balls the cap screw 40 is backed out and the cap screw 38 is losened and the cover plate 36 and seal plate 34 are swung around the center of the cap screw 38 to uncover the loading hole 30 and release the balls.

The seal plate 34 is provided with a threaded hole 46 for receiving a loading tool 48. Loading tool 48 is an elongated tube closed at one end and adapted to receive the exact number of balls required to fill an aligned set of grooves in the blade and hub. The balls are held in the loading tool 48 by a removable pin 50. The loading tool is threaded at the open end with threads mating with the threaded hole 46. In order to load the bearing the blade is pushed in until the base of the blade contacts a stop 52 (FIGURE 1) formed on the hub in the blade socket which will position the ball grooves 24 in alignment with the loading holes 30. The seal plate 34 is swung about the cap screw 38 so as to position the threaded hole 46 above the loading hole 30. The loading tool 48 is screwed into the seal plate 34 and the propeller is positioned so that the loading tool 48 and the loading hole 30 are vertically above the grooves 24 and 28. The retaining pin 50 is then removed and the balls flow readily and quickly into the groove 24. As the loading tool holds the exact required number of balls, assurance is given that the groove is completely full when the loading tool is completely empty. The blade may then be moved to its outward position and the cap screw 40 and the plug 44 returned to its position under the blade to hold the blade in its outward position. Suitable packing rings such as O-ring 54 and its associated retaining members may be provided to move into and out of the hub socket with the propeller blade and serve to prevent oil leakage from the hub socket. Suitable pitch changing mechanism such as a piston 56 and comprising a yoke 58 cooperating with a roller 60 mounted on a pin 62 extending inward from the base of the blade may be used to impart pitch changing movements to the blade.

The above description has been based upon a blade adapted to rotate about a horizontal axis with the loading holes in the plane of rotation of the blade so that the holes may be alternately positioned under the blade for unloading the balls and by rotating the propeller approximately 180° positioned above the blade for loading the balls. In the event that the propeller rotates about a vertical axis it would then be necessary to provide separate loading and unloading holes. The unloading holes being always below the propeller blade and the loading holes being always above the propeller blade.

FIGURE 8 shows a modification in which the clearance space 28 is reduced so that it represents only a slight enlargement, about $\frac{1}{32}$ inch, of the bearing race 26. In this modification the loading holes 30 which are of the same dimensions as previously described, that is having a width transverse of the bearing grooves slightly larger than one ball diameter and having a dimension along said grooves slightly larger than twice the ball diameter, will intersect the bearing race 26 itself and thus interrupt the bearing race for about two ball diameters. In this modification it is necessary to fill the loading holes with a plug 60, which may be formed integral with the sealing plate 34, to prevent the balls from entering the loading hole during pitch changing movements or while the blade is stationary. As the two ball diameter length of the race is a very small portion of the entire race, the loss of this much of the support is not serious. In the case of the propeller operational forces are such that one side of the thrust bearing is generally loaded much heavier than the other and this interruption in the race caused by the loading holes can be placed in the more lightly loaded portion of the bearing race.

From the above description it will be appreciated that I have provided an anti-friction bearing having cooperating bearing races and balls in which all of the balls can be almost instantly removed from the race and substantially as quickly reinserted into the race. This becomes of particular importance with a propeller on an aircraft in combat where the quick removal or replacement of a blade or blades may measure the margin of safety in a chance to escape.

It is to be understood that the invention is not limited to the specific embodiment herein illustrated and described, but may be used in other ways without departure from its spirit as defined by the following claims.

I claim:

1. In a bearing having an inner member and an outer member, each member having an annular ball receiving groove forming a ball race, adapted to receive balls rotatably holding said members and limiting relative axial movement of said members in one direction by seating said balls in said races, means for quickly assembling balls into said grooves comprising an annular enlargement groove in said outer member concentric with said races and adjacent to and having one side open to a race in said outer member and having a depth greater than the adjacent race and providing clearance for said balls, a ball receiving passageway leading from an exterior surface of said outer member to the enlargement groove in said outer member and having an axial dimension approximately but greater than the diameter of one of said balls and a circumferential dimension approximately but greater than twice said diameter, the axis of said bearing having a horizontal position in which said passageway is positioned vertically over said enlargement, a tube adapted to hold a predetermined number of balls, means positioning said tube containing said balls in vertical alignment with and connecting with said passageway, means releasing said balls from said tube into said passageway and enlargement, whereby said balls will roll freely under the influence of gravity from said tube and around said enlargement from where the balls will be seated in said races by relative axial movement of said members in said one direction.

2. In a bearing having telescoping, relatively axially movable inner and outer members relatively movable about an axis and held in assembled relation by an annular row of balls each member having an annular groove forming a bearing seat for said balls, relative movement of said members axially in one direction positioning said seats and balls in operative relation, means for quickly disassembling said balls from said bearing comprising an annular groove forming an annular seat enlargement in said outer member concentric with said seats and adjacent to and having one side open to said seat in said outer member and having a depth greater than said adjacent seat providing clearance for said balls, a passageway in said outer member extending from a exterior surface to the adjacent enlargement, said passageway having a dimension circumferential of said annular groove approximately, but greater than, twice the diameter of said balls, the axis of said bearing having a horizontal position in which said passageway is positioned under said enlargement, said bearing constructed so that relative axial movement of said members in the opposite direction will position said balls in said enlargement in alignment with said passageway under said enlargement, whereby said balls will roll out of said groove in a stream under the influence of gravity.

3. Disassembling means as claimed in claim 2 including stop means locating one seat and the entrained balls opposite said enlarged portion and said passageway of the outer member.

4. In a propeller blade mounting comprising a hub having a blade socket, a propeller blade having a portion extending into said socket, and having means rotatably supporting said blade in said socket against outward movement including at least one row of balls and a bearing race in said portion and a mating race in said socket adapted to receive said balls, means for quickly disassembling said balls from said races and releasing said blade comprising an annular clearance groove forming a race enlargement in said socket adjacent to but axially spaced from, concentric with and opening into said mating race and having a depth greater than said mating race, a passageway in said hub connected with said enlargement, said passageway having an axial dimension slightly larger than said balls and having a circumferential dimension slightly greater than twice the diameter of said balls, said portion movable axially outward to seat said balls in said races and movable in the opposite direction to position said balls in said enlargement and in alignment with said passageway, the axis of said mounting having a horizontal position with the passageway under said enlargement, whereby said blade may be released by inward movement in said hub.

5. Means as claimed in claim 4 including means introducing balls into the races comprising a tube adapted to releasably hold a row of balls, means positioning said tube on said hub in vertical alignment with said passageway, the axis of said blade mounting having a horizontal position in which the passageway is located above and in alignment with said enlargement and said bearing race with said portion in said socket for introducing said balls into empty races in said socket and blade portion.

6. Means as claimed in claim 5 including stop means limiting inward movement of said blade and locating the race in said blade portion in alignment with said passageway to facilitate inserting and removing said ball bearings.

7. In a propeller comprising a hub having a propeller blade socket and a propeller blade extending outwardly from said hub and having a portion extending into said socket and means rotatably supporting said blade in said socket including at least one annular row of balls in mating races in said socket and portion, means for loading said races, when empty, with balls comprising a groove forming an enlarged portion adjacent one of said races, concentric with and having a depth greater than the adjacent race to provide clearance for said balls upon axial inward movement of said blade with respect to said hub, a ball receiving passageway connected with the race in said hub, said passageway having an axial dimension slightly larger, but less than twice, the diameter of said balls, and a circumferential dimension greater than twice said diameter, said socket having a position in which said passageway extends vertically above said empty races and enlarged portion, a tube having an open end and adapted to hold sufficient balls to fill said empty races, means positioning said tube in vertical alignment with and above said passageway with said blade portion in said socket and said enlarged portion and the race in said blade portion in vertical alignment with and below said passageway so that said balls will run out of the open end of said tube through said passageway and into and around said enlarged portion and the race in said blade portion by gravity, said blade portion movable outwardly to move said balls from said enlarged portion into the race in said socket.

References Cited

UNITED STATES PATENTS

| 2,623,601 | 12/1952 | Frankland | 308—198 X |
| 2,624,644 | 1/1953 | Byrant | 308—198 |
| 3,148,922 | 9/1964 | Roessler | 308—198 |

FOREIGN PATENTS

| 1,001,473 | 10/1951 | France. |
| 921,170 | 3/1963 | Great Britain. |

EVERETTE A. POWELL, Jr., Primary Examiner

U.S. Cl. X.R.

170—160.58